United States Patent
Liu et al.

(10) Patent No.: US 10,797,778 B2
(45) Date of Patent: Oct. 6, 2020

(54) WIRELESS COMMUNICATION SYSTEM AND DRONE SYSTEM USING THE WIRELESS COMMUNICATION SYSTEM

(71) Applicant: AUTEL ROBOTICS CO., LTD., Shenzhen, Guangdong (CN)

(72) Inventors: Hong Liu, Guangdong (CN); Zhuanpeng Cheng, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 0 days.

(21) Appl. No.: 16/419,396

(22) Filed: May 22, 2019

(65) Prior Publication Data

US 2019/0273552 A1    Sep. 5, 2019

Related U.S. Application Data

(63) Continuation of application No. PCT/CN2017/111861, filed on Nov. 20, 2017.

(30) Foreign Application Priority Data

Nov. 22, 2016   (CN) .................... 2016 2 1261385 U

(51) Int. Cl.
*H04B 7/08* (2006.01)
*H04B 1/40* (2015.01)
(Continued)

(52) U.S. Cl.
CPC ........... *H04B 7/0802* (2013.01); *B64D 47/02* (2013.01); *H04B 1/40* (2013.01); *H04L 7/0331* (2013.01); *H04W 72/0453* (2013.01)

(58) Field of Classification Search
CPC ...... H04B 7/0802; H04B 1/40; H04B 1/0064; H04B 7/0848; B64D 47/02; H04L 7/0331; H04W 72/0453
See application file for complete search history.

(56) References Cited

U.S. PATENT DOCUMENTS

2007/0274410 A1* 11/2007 Gardner .................... H04L 1/06
                                                            375/267
2008/0136704 A1*  6/2008 Chan ....................... G01S 13/24
                                                            342/201
(Continued)

FOREIGN PATENT DOCUMENTS

CN         102217349 A    10/2011
CN         102932029 A     2/2013
(Continued)

OTHER PUBLICATIONS

International Search Report and Written Opinion dated Jan. 29, 2018; PCT/CN2017/111861.

Primary Examiner — Jae Y Lee

(57) ABSTRACT

A wireless communication system and a drone system using the wireless communication system are provided. The wireless communication system includes a first communication module and a second communication module. The first communication module transmits a same signal in a first frequency band and a second frequency band respectively by means of power splitting and frequency conversion, the first frequency band being different from the second frequency band. The second communication module separately receives the signal transmitted by the first communication module in the first frequency band and the signal transmitted by the first communication module in the second frequency band, and converts the received signal of the second frequency band into the signal of the first frequency band through frequency conversion, and performs diversity reception with the received signal of the first frequency band. The present utility model can effectively avoid interference of a single frequency band, to improve the reliability of communication.

20 Claims, 1 Drawing Sheet

(51) Int. Cl.
*H04L 7/033* (2006.01)
*H04W 72/04* (2009.01)
*B64D 47/02* (2006.01)

(56) References Cited

U.S. PATENT DOCUMENTS

| | | |
|---|---|---|
| 2013/0207875 A1 | 8/2013 | Chang |
| 2013/0253612 A1* | 9/2013 | Chow ............... H02J 50/20 607/60 |
| 2019/0248251 A1* | 8/2019 | Park ............... B60R 21/015 |

FOREIGN PATENT DOCUMENTS

| | | |
|---|---|---|
| CN | 103441338 A | 12/2013 |
| CN | 105207709 A | 12/2015 |
| CN | 206164528 U | 5/2017 |

* cited by examiner

WIRELESS COMMUNICATION SYSTEM AND DRONE SYSTEM USING THE WIRELESS COMMUNICATION SYSTEM

CROSS REFERENCE

This application is a continuation of International Application No. PCT/CN2017/111861, filed on Nov. 20, 2017, which claims priority of Chinese Patent No. 2016212613858, filed on Nov. 22, 2016, both of which are incorporated herein by reference in their entireties.

TECHNICAL FIELD

The present utility model relates to a wireless communication system, and in particular, to a system adapted to implement wireless communication between a drone and a remote control device.

RELATED ART

In an existing wireless point-to-point communication system, cases of signal interference usually occur. Consequently, data transmission quality decreases severely, and even communication interruption is caused. For example, data and image transmission between a drone and a remote control is badly affected by external interference signals.

Currently, existing wireless communication mainly has the following implementations. First, one transmission and one reception of a single frequency band, namely, a transmit end configures a transmit unit of a single frequency band, and a receiving end configures a receiving unit of a single frequency band to implement transmission of a large information amount. In this structure, when the single frequency band is interfered, the transmission quality decreases, and system breakdown even occurs in severe cases, and the communication reliability is relatively poor. Second, one transmission and two receptions of a single frequency band, namely, the receiving end has two receiving units of a single frequency band. In this structure, although the receiving capability is improved, interference of a single frequency band cannot be effectively avoided, and the reliability of communication cannot be ensured. Third, two transmissions and two receptions of a single frequency band, namely, the transmit end has two transmit units of a single frequency band, and the receiving end has two receiving units of a single frequency band. In this structure, although the receiving capability and the receiving capability are both improved, interference of a single frequency band cannot be effectively avoided, and the reliability of communication still cannot be ensured. Therefore, how to effectively avoid signal interference and improve the reliability of communication is a problem that urgently needs to be resolved currently.

SUMMARY

The technical problem to be resolved by the present utility model is to overcome the deficiency of the foregoing prior art, and provide a wireless communication system that can effectively avoid interference of a single frequency band, to improve the reliability of communication.

With respect to the foregoing technical problem, the present utility model provides a wireless communication system, including a first communication module and a second communication module. The first communication module transmits a same signal in a first frequency band and a second frequency band respectively by means of power splitting and frequency conversion, the first frequency band being different from the second frequency band. The second communication module separately receives the signal transmitted by the first communication module in the first frequency band and the signal transmitted by the first communication module in the second frequency band, and converts the received signal of the second frequency band into the signal of the first frequency band through frequency conversion, and performs diversity reception with the received signal of the first frequency band.

With respect to the foregoing technical problem, the present utility model further provides a drone system, including a drone and a remote control device, where the drone system further includes the foregoing wireless communication system, the first communication module of the wireless communication system being disposed on the drone, and the second communication module of the wireless communication system being disposed on the remote control device.

Compared with the prior art, in the wireless communication system of the present utility model, a to-be-sent signal is cleverly divided into two different frequency bands, namely, the first and second frequency bands through power splitting and frequency conversion in the first communication module for simultaneous transmission. Correspondingly, transmission of the two different frequency bands is simultaneously received in the second communication module, and the received signal of the second frequency band is converted into the signal of the first frequency band through frequency conversion and then diversity reception is performed with the received signal of the first frequency band, so that interference of a single frequency band can be effectively avoided, thereby improving the reliability of communication.

The descriptions of reference signs of the accompanying drawings are as follows: 10. Wireless communication system; 1. First communication module; 2. Second communication module; 11. First transceiver circuit; 12. Power splitter; 13. First transmit unit; 14. First frequency conversion unit; 15. Second transmit unit; 21. Second transceiver circuit; 23. First receiving unit; 24. Second frequency conversion unit; 25. Second receiving unit; 101. First transceiver chip; 102, 103, 104, 105, 106, 107. Antenna interface; 120. First mixer; 121. First phase-locked loop; 201. Second transceiver chip; 202, 203, 206, 207. Antenna interface; 243. Second mixer; 244. Second phase-locked loop.

DETAILED DESCRIPTION

The following clearly describes the technical solutions of the present utility model with reference to the accompanying drawings. Apparently, the described embodiments are some of the embodiments of the present utility model, rather than all the embodiments of the present utility model. Based on the embodiments in the present utility model, all other embodiments obtained by a person of ordinary skill in the art without creative efforts shall fall within the protection scope of the present utility model.

In the description of the present utility model, it should be noted that orientation or position relationships indicated by terms such as "center", "on", "below", "left", "right", "vertical", "horizontal", "inside" and "outside" are based on orientation or position relationships shown in the accompanying drawings, and are used only for facilitating describing the present utility model and simplifying the description, rather than indicating or implying that the mentioned apparatus or component needs to have a specific orientation, and needs to be constructed and operated in the specific orientation, and therefore the terms cannot be understood as a limitation to the present utility model. Moreover, the terms "first", "second", "third" and the like are used only for descriptive purposes, and cannot be construed as indicating or implying relative importance.

In the description of the present utility model, it should be noted that unless otherwise explicitly stipulated and defined, the terms "installation", "connected" and "connection" should be understood in a broad sense. For example, the connection may be a fixed connection, a detachable connection, or an integral connection; the connection may be a mechanical connection, or an electric connection; the connection may be a direct connection, an indirect connection through an intermediary, or internal communication between two elements. A person of ordinary skill in the art may understand the specific meanings of the foregoing terms in the present utility model according to specific situations.

In addition, the technical features involved in different embodiments of the present utility model described below can be combined with each other provided that they do not form a conflict with each other.

Figure 1:
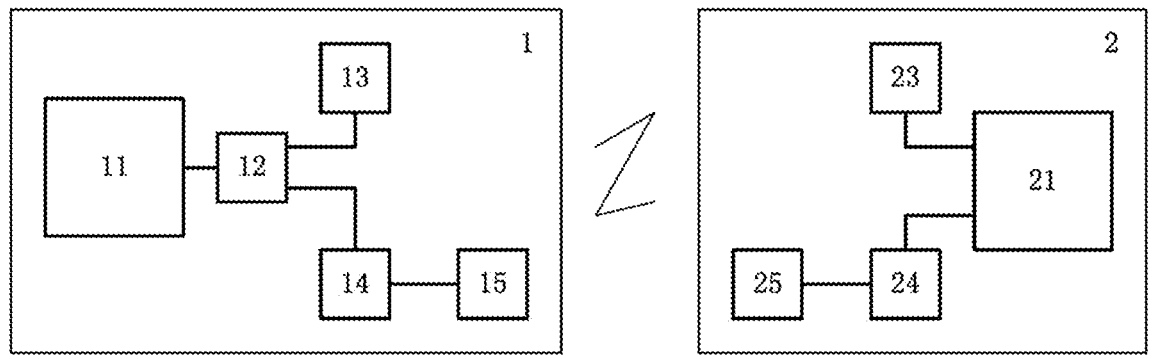
FIG. 1 is a block diagram of a principle of a preferred embodiment of a wireless communication system of the present utility model.

FIG. 1 is a block diagram of a principle of a preferred embodiment of a wireless communication system of the present utility model. Using application to a drone system as an example, the present utility model provides a wireless communication system 10. The drone system includes a drone, a remote control device, and the wireless communication system 10. The wireless communication system 10 includes a first communication module 1 disposed on the drone and a second communication module 2 disposed on the remote control device matching the drone. The remote control device is configured to control flight of the drone, and may include but is not limited to devices such as a remote control, a smartphone, a tablet computer, and a personal digital assistant (PDA). Specifically, the first communication module 1 transmits a same signal in a first frequency band and a second frequency band respectively by means of power splitting and frequency conversion, the first frequency band being different from the second frequency band. The second communication module 2 separately receives the signal transmitted by the first communication module 1 in the first frequency band and the signal transmitted by the first communication module in the second frequency band, and converts the received signal of the second frequency band into the signal of the first frequency band through frequency conversion, and performs diversity reception with the received signal of the first frequency band.

The first communication module 1 may include: a first transceiver circuit 11, configured to output a signal; a power splitter 12, connected to a first transmit port of the first transceiver circuit 11, and configured to perform power splitting on the signal output by the first transceiver circuit 11, to obtain two paths of outputs, where the two paths of outputs may be the same; a first transmit unit 13, connected to one path of output of the power splitter 12, and configured to transmit a signal in the first frequency band; a first frequency conversion unit 14, connected to the other path of output of the power splitter 12, and configured to convert the first frequency band into the second frequency band; and a second transmit unit 15, connected to an output of the first frequency conversion unit 14, and configured to transmit a signal in the second frequency band.

The second communication module 2 may include: a first receiving unit 23, configured to receive the signal of the first frequency band; a second receiving unit 25, configured to receive the signal of the second frequency band; a second frequency conversion unit 24, connected to an output of the second receiving unit 25, and configured to convert the signal of the second frequency band into the signal of the first frequency band; and a second transceiver circuit 21, connected to the first receiving unit 23 and the second frequency conversion unit 24, and configured to perform diversity reception on the signal of the first frequency band that is received by the first receiving unit 23 and the signal that is of the first frequency band and that is obtained through frequency conversion by the second frequency conversion unit 24.

The working principle of the wireless communication system 10 may approximately include: a same transmit signal output by the first transceiver circuit 11 on the first communication module 1 is divided into two paths through the power splitter 12. One path is transmitted by using the first transmit unit 13, and the other path is first processed by the first frequency conversion unit 14 into the signal of the second frequency band, and then is transmitted by using the second transmit unit 15. To be specific, the first communication module 1 sends a same signal simultaneously by using the first frequency band and the second frequency band different from the first frequency band.

Correspondingly, the second transceiver circuit 21 on the second communication module 2 can receive the transmit signals of two frequency bands of the first communication module 1 respectively by using the first receiving unit 23 and the second receiving unit 25. The signal sent by the first transmit unit 13 is received by the first receiving unit 23 and then is directly sent to the second transceiver circuit 21. The signal sent by the second transmit unit 15 is received by the second receiving unit 25, and then the second frequency conversion unit 24 performs frequency conversion on the signal, and the signal is converted from the second frequency band to the first frequency band, and then is sent to the second transceiver circuit 21. The second transceiver circuit 21 performs diversity reception on the signal received by the first receiving unit 23 and the signal that is obtained through frequency conversion by the second frequency conversion unit 24, to combine the two paths of signals, to reduce signal fading, and restore, to the greatest extent, the signal sent by the first communication module 1.

Optionally, the first transmit unit 13 may include at least a first switch, a first antenna interface and a second antenna interface, the first switch is connected to the first antenna interface and the second antenna interface, and the first antenna interface or the second antenna interface may be selected by using the first switch to transmit a signal in the first frequency band; the second transmit unit 15 may include at least a second switch, a third antenna interface and a fourth antenna interface, the second switch is connected to the third antenna interface and the fourth antenna interface, and the third antenna interface or the fourth antenna interface may be selected by using the second switch to transmit a signal in the second frequency band.

Optionally, the first frequency conversion unit 14 may include a first mixer and a first phase-locked loop, the first phase-locked loop providing a local-frequency signal of the second frequency band for the first mixer Optionally, the first communication module 1 may further include a third transmit unit, connected to a second transmit port of the first transceiver circuit 11 and configured to transmit a signal in a third frequency band, the third frequency band being different from the first frequency band.

Optionally, the third transmit unit may include at least a third switch, a fifth antenna interface and a sixth antenna interface, the third switch is connected to the fifth antenna interface and the sixth antenna interface, and the fifth antenna interface or the sixth antenna interface may be selected by using the third switch to transmit a signal in the third frequency band.

Optionally, the second frequency conversion unit 24 may include a second mixer and a second phase-locked loop, the second phase-locked loop providing a local-frequency signal of the first frequency band for the second mixer Optionally, the second communication module 2 may further include a third receiving unit and a fourth receiving unit, separately configured to receive the signal of the third frequency band; the second transceiver circuit 21 is connected to the third receiving unit and the fourth receiving unit, and is further configured to perform diversity reception on the signal of the third frequency band that is received by the third receiving unit and the fourth receiving unit.

Optionally, the first receiving unit 23 may include at least a seventh antenna interface, and the signal of the first frequency band is received by using the seventh antenna interface; the second receiving unit 25 may include at least an eighth antenna interface, and the signal of the second frequency band is received by using the eighth antenna interface. The third receiving unit may include at least a ninth antenna interface, and the signal of the third frequency band is received by using the ninth antenna interface; the fourth receiving unit may include at least a tenth antenna interface, and the signal of the third frequency band is received by using the tenth antenna interface. The seventh antenna interface and the ninth antenna interface may share one dual-band and dual-feed antenna, and the eighth antenna interface and the tenth antenna interface may share another dual-band and dual-feed antenna.

Figure 2:
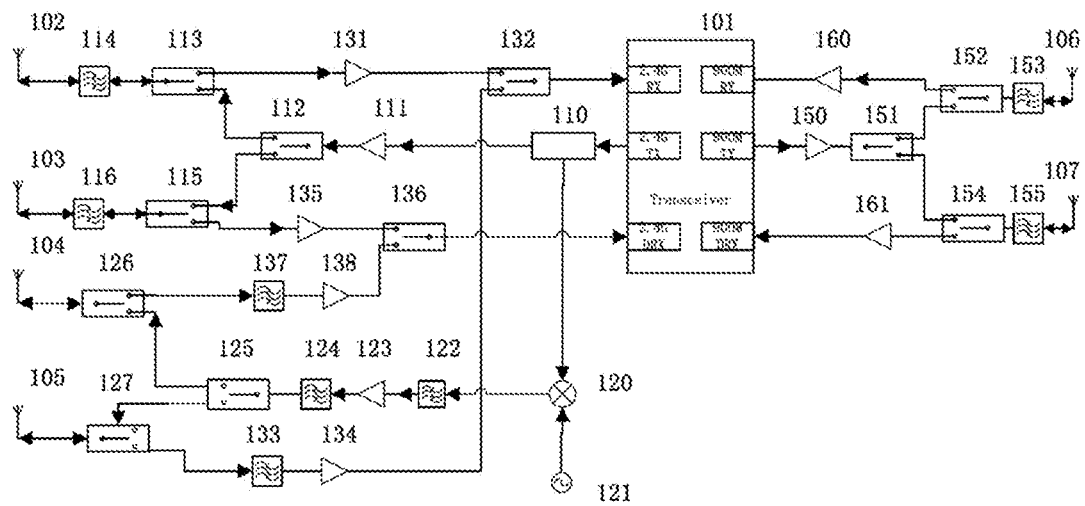
FIG. 2 is a block diagram of a principle of a preferred embodiment of a first communication module in a wireless communication system of the present utility model.

FIG. 2 is a block diagram of a principle of a preferred embodiment of a first communication module in a wireless communication system of the present utility model. The first transceiver circuit 11 in the first communication module 1 may include a first transceiver chip 101. The chip is a dual-band transceiver chip, and is configured to process a wireless signal, to meet requirements for a frequency band in different countries. For example, 2.4G ISM and 900M ISM frequency bands may be used in North America, and 2.4G and 5.8G ISM frequency bands may be used in Europe. In this embodiment, descriptions are provided by using an example in which the first transceiver chip 101 may process 2.4G and 900M frequency bands. To be specific, the first frequency band is the 2.4G ISM frequency band, the second frequency band is the 5.8G ISM frequency band, and the third frequency band is the 900M ISM frequency band. A frequency band combination shown in FIG. 2 is merely an optional implementation, and different frequency bands may further be combined in any way. This is not limited in this embodiment.

Specifically, a 2.4G sending port (that is, the first transmit port) of the first transceiver chip 101 first sends a 2.4G (that is, the first frequency band) sending signal to the power splitter 110. After the power splitter 110 performs power splitting on the signal, one path of signal passes through an amplifier 111 for power amplifier, and after being selected by a first switch 112, the signal is then sent to the first antenna interface 102 by using a switch 113 and a filter 114; alternatively, after being selected by the first switch 112, the signal is then sent to the second antenna interface 103 by using the switch 115 and the filter 116.

It may be understood that the first transceiver chip 101 is a specific implementation of the foregoing first transceiver circuit 11. The amplifier 111, the first switch 112, the switch 113, the filter 114, the first antenna interface 102, the switch 115, the filter 116, and the second antenna interface 103 herein are a specific implementation of the foregoing first transmit unit 13. The first antenna interface 102 and the second antenna interface 103 are both 2.4G antenna interfaces.

The other path of signal is sent to the first mixer 120, is mixed with the local-frequency signal provided by the first phase-locked loop 121, and is up converted to 5.8G (that is, the second frequency band), and then is sequentially processed by the filter 122, the 5.8G amplifier 123, and the 5.8G amplifier 124, selected by the second switch 125, and is then sent to the third antenna interface 104 by using the switch 126, or is selected by the second switch 125, and is then sent to the fourth antenna interface 105 by the switch 127.

It may be understood that the first mixer 120 and the first phase-locked loop 121 herein are a specific implementation of the foregoing first frequency conversion unit 14. The filter 122, the 5.8G amplifier 123, the 5.8G filter 124, the second switch 125, the switch 126, the third antenna interface 104, the switch 127, and the fourth antenna interface 105 herein are a specific implementation of the foregoing second transmit unit 15. The third antenna interface 104 and the fourth antenna interface 105 are both 2.4G/5.8G dual-band antenna interfaces.

The 900M sending port (that is, the second transmit port) of the first transceiver chip 101 sends a 900M (that is, the third frequency band) sending signal to the amplifier 150, and the signal is first selected by the third switch 151, and then is sent to the fifth antenna interface 106 by the switch 152 and the 900M filter 153, or is selected by the third switch 151, and is then sent to the sixth antenna interface 107 by the switch 154 and the 900M filter 155.

It may be understood that the amplifier 150, the third switch 151, the switch 152, the filter 153, the fifth antenna interface 106, the switch 154, the filter 155, and the sixth antenna interface 107 herein together form the third transmit unit on the first communication module 1, for signal transmission in 900M (that is, the third frequency band).

In this embodiment, the first to sixth antenna interfaces 102 to 107 may further be separately configured to receive signals.

Specifically, a 2.4G receiving port of the first transceiver chip 101 is connected to the switch 132, and a signal received by the first antenna interface 102 sequentially passes through the filter 114, the switch 113 and the low-noise amplifier 131 and is sent to the switch 132; or the signal received by the fourth antenna interface 105 sequentially passes through the switch 127, the 2.4G filter 133 and the low-noise amplifier 134 and is sent to the switch 132. By using this structure, a signal can be received alternatively by using the first antenna interface 102 and the fourth antenna interface 105. To be specific, one path of signal is selected by the switch 132, and is input into a 2.4G receiving port of the first transceiver chip 101.

Another 2.4G receiving port of the first transceiver chip 101 is connected to the switch 136, and a signal received by the second antenna interface 103 sequentially passes through the filter 116, the switch 115 and the low-noise amplifier 135 and is sent to the switch 136; or the signal received by the third antenna interface 104 sequentially passes through the switch 126, the 2.4G filter 137 and the low-noise amplifier 138 and is sent to the switch 136. By using this structure, a signal can be received alternatively by using the second antenna interface 103 and the third antenna interface 104. To be specific, one path of signal is selected by the switch 136, and is input into another 2.4G receiving port of the first transceiver chip 101. The first transceiver chip 101 separately receives the signal of the 2.4G frequency band by using two 2.4G receiving ports, and performs diversity reception on the signal.

The signal received by the fifth antenna interface 106 passes through the 900M filter 153, the switch 152 and the low-noise amplifier 160, and is sent to a 900M receiving port of the first transceiver chip 101. The signal received by the sixth antenna interface 107 passes through the 900M filter 155, the switch 154 and the low-noise amplifier 161 and is sent to another 900M receiving port of the first transceiver chip 101. The first transceiver chip 101 separately receives the signal of the 900M frequency band by using two 900M receiving ports, and performs diversity reception on the signal.

It should be noted that the first communication module 1 is designed with six antenna interfaces 102, 103, 104, 105, 106 and 107. Single-band one transmission and two receptions of frequency hopping of the 2.4G and 900M frequency bands, one transmission and two receptions of the 2.4G frequency band, and single-transmission 2.4G two transmissions of 5.8G can be implemented according to actual application requirements, and the signal data transmitted in 5.8G is consistent with signal data transmitted in 2.4G. A 2.4G receiving channel may be switched between the antenna interfaces 102, 103, 104 and 105, to implement 2.4G diversity reception of the first communication module 1.

The first communication module 1 is designed with four antenna interfaces 102, 103, 104 and 105 with respect to the 2.4G frequency band, so that when a faun of the drone changes, the first communication module 1 can always select an optimal antenna direction to align with the second communication module 2. For example, when the drone has different postures such as rotation, ascending, and descending in air, the first communication module 1 can always select an optimal antenna for communication.

The first communication module 1 is used on the drone, and is responsible for transmitting large-capacity data such as images, and receiving small-capacity data such as remote control signals. A multi-antenna switching structure on the first communication module 1 facilitates an antenna directional pattern to align with a remote control end when the drone body is located at different postures, to ensure an optimal transmission path of signals.

The first communication module 1 adopts transmission in multiple frequency bands, namely, 900M, 2.4G, and 5.8G frequency bands, so that during image transmission, possible interference signals can be avoided in space, to ensure the image transmission quality. In addition, 2.4G multi-antenna switching and diversity reception facilitate ensuring that a 2.4G sending signal of the remote control end can be correctly received, and that receiving quality is effectively improved.

Figure 3:
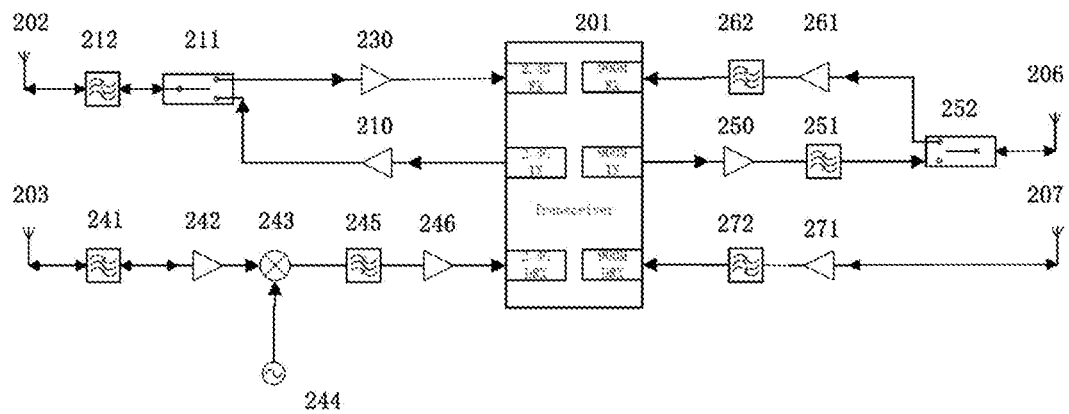
FIG. 3 is a block diagram of a principle of a preferred embodiment of a second communication module in a wireless communication system of the present utility model.

FIG. 3 is a block diagram of a principle of a preferred embodiment of a second communication module in a wireless communication system of the present utility model. The second transceiver circuit 21 of the second communication module 2 selects a second transceiver chip 201 the same as the foregoing first transceiver chip 101. A seventh antenna interface 202 and a ninth antenna interface 206 share a 900M and 2.4G dual-band and dual-feed antenna. An eighth antenna interface 203 and a tenth antenna interface 207 share a 900M and 5.8G dual-band and dual-feed antenna. The dual-band and dual-feed antenna herein refers to a dual-band antenna that can implement signal transmission of two frequency bands. The dual-band antenna has two feed lines. One feed line is connected to an antenna interface, and the other feed line is connected to another antenna interface.

Specifically, a 2.4G receiving port of the second transceiver chip 201 is configured to receive a signal received by the seventh antenna interface 202. The signal received by the seventh antenna interface 202 sequentially passes through the 2.4G filter 212, the switch 211 and the low-noise amplifier 230 and is sent to the 2.4G receiving port. It may be understood that the seventh antenna interface 202, the 2.4G filter 212, the switch 211 and the low-noise amplifier 230 herein are a specific implementation of the foregoing first receiving unit 23. The seventh antenna interface 202 is configured to receive a signal of a 2.4G frequency band (that is, the first frequency band).

Another 2.4G receiving port of the second transceiver chip 201 is configured to receive a signal received by the eighth antenna interface 203. The 5.8G (that is, the second frequency band) signal received by the eighth antenna interface 203 sequentially passes through a 5.8G filter 241 and a low-noise amplifier 242 and is sent to a second mixer 243, and is mixed with a local-frequency signal provided by a second phase-locked loop 244, is converted to 2.4G, and then passes through a 2.4G filter 245 and a low-noise amplifier 246 and is sent to another 2.4G receiving port of the second transceiver chip 201, so that the second transceiver chip 201 implements diversity reception on the 2.4G frequency band signal. It may be understood that the eighth antenna interface 203, the 5.8G filter 241 and the low-noise amplifier 242 herein are a specific implementation of the foregoing second receiving unit 25. The second mixer 243 and the second phase-locked loop 244 herein are a specific implementation of the foregoing second frequency conversion unit 24.

A 900M receiving port of the second transceiver chip 201 is configured to receive a signal received by the ninth antenna interface 206. The 900M (that is, the third frequency band) signal received by the ninth antenna interface 206 passes through a switch 252, a low-noise amplifier 261 and a 900M filter 262, and is sent to a 900M receiving port of the second transceiver chip 201. The 900M signal received by the tenth antenna interface 207 passes through a low-noise amplifier 271 and a 900M filter 272, and is sent to another 900M receiving port of the second transceiver chip 201. It may be understood that the ninth antenna interface 206, the switch 252, the low-noise amplifier 261 and the 900M filter 262 herein form a third receiving unit of the second communication module 2. The tenth antenna interface 207, the low-noise amplifier 271 and the 900M filter 272 herein form a fourth receiving unit of the second communication module 2.

In this embodiment, the seventh antenna interface 202 and the ninth antenna interface 206 may further be separately configured to transmit signals. The seventh antenna interface 202 is configured to transmit 2.4G signals, and the ninth antenna interface 206 is configured to transmit 900M signals.

Specifically, the 2.4G sending port of the second transceiver chip 201 sends a signal to the amplifier 210, and then the signal passes through the switch 211 and the 2.4G filter 212 and is sent to the seventh antenna interface 202.

The 900M sending port of the second transceiver chip 201 sends the signal to the amplifier 250, and then the signal passes through the 900M filter 251 and the switch 252, and is sent to the ninth antenna interface 206.

The second communication module 2 is used on the remote control device matching the drone, and is responsible for receiving large data signals such as an image transmitted back by the drone, and transmitting a remote control signal to control the drone. The four antenna interfaces 202, 203, 206 and 207 on the second communication module 2 use two dual-band antennas. When a single antenna is adopted for transmission, transmission of key small-capacity data such as 2.4G or 900M remote control signals is facilitated. When dual antennas are adopted for reception, reception of large-capacity image signals such as 900M, 2.4G and 5.8G image signals is facilitated, to ensure that a two-transmission diversity reception channel of a receiving link enters the second transceiver chip 201, to improve received signal quality.

When the wireless communication system 10 of the present utility model is adopted, when the wireless communication system 10 works in the 2.4G frequency band, the antenna interface 202 receives and/or transmits the 2.4G frequency band signal, the antenna interface 203 receives the 5.8G signal, and after being down converted to the 2.4G frequency band, the signal and the received signal of the antenna interface 202 form a diversity reception link, to implement a one-reception and two-transmission communication system of the 2.4G frequency band.

If relatively strong interference is applied to 2.4G in space, 2.4G transmission can reduce a signal transmission rate, to improve the actual sensitivity of a receiving channel of the first communication module 1. The 5.8G receiving link can ensure that signal transmission from the first communication module 1 to the second communication module 2 is not interrupted, to improve the transmission quality, thereby improving the reliability of point-to-point transmission.

In addition, when the wireless communication system 10 detects that the 2.4G interference signal is relatively strong, in countries or districts allowing work of the 900M frequency band, the system 10 can seamlessly switch to the 900M frequency band, to ensure that signal transmission is not interrupted, thereby effectively ensuring the reliability of transmission.

It may be understood that components such as the filter, the amplifier and the antenna interface involved in this embodiment may be correspondingly adjusted according to specific frequency band requirements. For example, when the first frequency band is 5.8G and the second frequency band is 2.4G, the first antenna interface 102 and the second antenna interface 103 are configured to receive and/or transmit 5.8G signals, and the 5.8G signals passing through the power splitter 12 pass through the first mixer 120 and the first phase-locked loop 121 and are down converted to 2.4G, and pass through the amplifier 123 and the filter 124 for output. In this case, the amplifier 123 and the filter 124 are both for 2.4G signals.

In this embodiment, the wireless communication system 10 is not only applicable to a drone system, but also applicable to another point-to-point long distance transmission scenario, such as wireless radio monitoring.

Compared with the prior art, by using the wireless communication system 10 of the present utility model, multi-band transmission of same data is performed in space, and anti-interference is effectively enhanced, and when data is interfered in one frequency band, it can be ensured that the data can be transmitted in another frequency band, so that the reliability of communication is effectively improved. In addition, diversity reception of a receiving end may be implemented without adding an antenna interface and a receiving link, to improve receiving sensitivity.

The foregoing content is merely preferred embodiments of the present utility model, and is not intended to limit implementation solutions of the present utility model. A person of ordinary skill in the art may conveniently perform flexible modification according to the main concept and spirit of the present utility model. Therefore, the protection scope of the present utility model is subject to the appended claims.

What is claimed is:

1. A wireless communication system, comprising a first communication module and a second communication module, the first communication module transmitting a same signal in a first frequency band and a second frequency band respectively by means of power splitting and frequency conversion, wherein the first frequency band is different from the second frequency band; and wherein the second communication module separately receives a signal transmitted by the first communication module in the first frequency band and a signal transmitted by the first communication module in the second frequency band, and converts the signal of the second frequency band into the signal of the first frequency band through frequency conversion, and performs diversity reception with the signal of the first frequency band.

2. The wireless communication system according to claim 1, wherein the first communication module comprises:

a first transceiver circuit, configured to output a signal;

a power splitter, connected to a first transmit port of the first transceiver circuit, and configured to perform power splitting on the signal output by the first transceiver circuit, to obtain two paths of outputs;

a first transmit unit, connected to one path of output of the power splitter, and configured to transmit the signal in the first frequency band;

a first frequency conversion unit, connected to the other path of output of the power splitter, and configured to convert the first frequency band into the second frequency band; and a second transmit unit, connected to an output of the first frequency conversion unit, and configured to transmit the signal in the second frequency band.

3. The wireless communication system according to claim 2, wherein the first transmit unit comprises a first switch, a first antenna interface and a second antenna interface, the first switch is connected to the first antenna interface and the second antenna interface, and the first antenna interface or the second antenna interface is selected by using the first switch to transmit the signal in the first frequency band;

wherein the second transmit unit comprises a second switch, a third antenna interface and a fourth antenna interface, the second switch is connected to the third antenna interface and the fourth antenna interface, and the third antenna interface or the fourth antenna interface is selected by using the second switch to transmit the signal in the second frequency band.

4. The wireless communication system according to claim 2, wherein the first frequency conversion unit comprises a first mixer and a first phase-locked loop, the first phase-locked loop providing a local-frequency signal of the second frequency band for the first mixer.

5. The wireless communication system according to claim 2, wherein the first communication module further comprises a third transmit unit, the third transmit unit being connected to a second transmit port of the first transceiver circuit and configured to transmit a signal in a third frequency band, the third frequency band being different from the first frequency band.

6. The wireless communication system according to claim 5, wherein the third transmit unit comprises a third switch, a fifth antenna interface and a sixth antenna interface, the third switch is connected to the fifth antenna interface and the sixth antenna interface, and the fifth antenna interface or the sixth antenna interface is selected by using the third switch to transmit the signal in the third frequency band.

7. The wireless communication system according to claim 1, wherein the second communication module comprises:
a first receiving unit, configured to receive the signal of the first frequency band;
a second receiving unit, configured to receive the signal of the second frequency band;
a second frequency conversion unit, connected to an output of the second receiving unit, and configured to convert the signal of the second frequency band into the signal of the first frequency band; and
a second transceiver circuit, connected to the first receiving unit and the second frequency conversion unit, and configured to perform diversity reception on the signal of the first frequency band that is received by the first receiving unit and the signal that is of the first frequency band and that is obtained through frequency conversion by the second frequency conversion unit.

8. The wireless communication system according to claim 7, wherein the second frequency conversion unit comprises a second mixer and a second phase-locked loop, the second phase-locked loop providing a local-frequency signal of the first frequency band for the second mixer.

9. The wireless communication system according to claim 7, wherein the second communication module further comprises a third receiving unit and a fourth receiving unit, separately configured to receive a signal of the third frequency band; the second transceiver circuit is connected to the third receiving unit and the fourth receiving unit, and is further configured to perform diversity reception on the signal of the third frequency band that is received by the third receiving unit and the fourth receiving unit.

10. The wireless communication system according to claim 9, wherein the first receiving unit comprises a seventh antenna interface, and the signal of the first frequency band is received by using the seventh antenna interface; the second receiving unit comprises an eighth antenna interface, and the signal of the second frequency band is received by using the eighth antenna interface.

11. The wireless communication system according to claim 10, wherein the third receiving unit comprises a ninth antenna interface, and the signal of the third frequency band is received by using the ninth antenna interface; the fourth receiving unit comprises a tenth antenna interface, and the signal of the third frequency band is received by using the tenth antenna interface.

12. The wireless communication system according to claim 11, wherein the seventh antenna interface and the ninth antenna interface share one dual-band and dual-feed antenna, and the eighth antenna interface and the tenth antenna interface share another dual-band and dual-feed antenna.

13. A drone system, comprising a drone and a remote control device, wherein the drone system further comprises a wireless communication system, wherein the wireless communication system comprises a first communication module and a second communication module, the first communication module transmitting a same signal in a first frequency band and a second frequency band respectively by means of power splitting and frequency conversion, wherein the first frequency band is different from the second frequency band; and
wherein the second communication module separately receives a signal transmitted by the first communication module in the first frequency band and a signal transmitted by the first communication module in the second frequency band, and converts the signal of the second frequency band into the signal of the first frequency band through frequency conversion, and performs diversity reception with the signal of the first frequency band;
wherein the first communication module of the wireless communication system is disposed on the drone, and the second communication module of the wireless communication system is disposed on the remote control device.

14. The drone system according to claim 13, wherein the first communication module comprises:
a first transceiver circuit, configured to output a signal;
a power splitter, connected to a first transmit port of the first transceiver circuit, and configured to perform power splitting on the signal output by the first transceiver circuit, to obtain two paths of outputs;
a first transmit unit, connected to one path of output of the power splitter, and configured to transmit the signal in the first frequency band;
a first frequency conversion unit, connected to the other path of output of the power splitter, and configured to convert the first frequency band into the second frequency band; and
a second transmit unit, connected to an output of the first frequency conversion unit, and configured to transmit the signal in the second frequency band.

15. The drone system according to claim 14, wherein the first transmit unit comprises a first switch, a first antenna interface and a second antenna interface, the first switch is connected to the first antenna interface and the second antenna interface, and the first antenna interface or the second antenna interface is selected by using the first switch to transmit the signal in the first frequency band;
wherein the second transmit unit comprises a second switch, a third antenna interface and a fourth antenna interface, the second switch is connected to the third antenna interface and the fourth antenna interface, and the third antenna interface or the fourth antenna interface is selected by using the second switch to transmit the signal in the second frequency band.

16. The drone system according to claim 14, wherein the first frequency conversion unit comprises a first mixer and a first phase-locked loop, the first phase-locked loop providing a local-frequency signal of the second frequency band for the first mixer.

17. The drone system according to claim 14, wherein the first communication module further comprises a third transmit unit, the third transmit unit being connected to a second transmit port of the first transceiver circuit and configured to transmit a signal in a third frequency band, the third frequency band being different from the first frequency band.

18. The drone system according to claim 17, wherein the third transmit unit comprises a third switch, a fifth antenna interface and a sixth antenna interface, the third switch is connected to the fifth antenna interface and the sixth antenna interface, and the fifth antenna interface or the sixth antenna interface is selected by using the third switch to transmit the signal in the third frequency band.

19. The drone system according to claim 13, wherein the second communication module comprises:
   a first receiving unit, configured to receive the signal of the first frequency band;
   a second receiving unit, configured to receive the signal of the second frequency band;
   a second frequency conversion unit, connected to an output of the second receiving unit, and configured to convert the signal of the second frequency band into the signal of the first frequency band; and
   a second transceiver circuit, connected to the first receiving unit and the second frequency conversion unit, and configured to perform diversity reception on the signal of the first frequency band that is received by the first receiving unit and the signal that is of the first frequency band and that is obtained through frequency conversion by the second frequency conversion unit.

20. The drone system according to claim 19, wherein the second frequency conversion unit comprises a second mixer and a second phase-locked loop, the second phase-locked loop providing a local-frequency signal of the first frequency band for the second mixer.

* * * * *